(12) United States Patent
Powell et al.

(10) Patent No.: US 9,187,059 B2
(45) Date of Patent: Nov. 17, 2015

(54) ADJUSTABLE LAP STRAP SYSTEM

(71) Applicant: Britax Romer Kindersicherheit GmbH, Ulm (DE)

(72) Inventors: Iain Powell, Andover (GB); David Shaun Carine, Nr Andover (GB)

(73) Assignee: BRITAX RÖMER KINDERSICHERHEIT GMBH, Ulm (DE)

( * ) Notice: Subject to any disclaimer, the term of this patent is extended or adjusted under 35 U.S.C. 154(b) by 26 days.

(21) Appl. No.: 13/778,943

(22) Filed: Feb. 27, 2013

(65) Prior Publication Data
US 2014/0070597 A1  Mar. 13, 2014

(30) Foreign Application Priority Data
Mar. 1, 2012  (EP) ..................... 12001387

(51) Int. Cl.
  *B60R 22/00*  (2006.01)
  *B60R 22/10*  (2006.01)
  *B60N 2/28*  (2006.01)

(52) U.S. Cl.
  CPC ............ *B60R 22/105* (2013.01); *B60N 2/2812* (2013.01); *B60N 2002/2815* (2013.01); *B60N 2002/2818* (2013.01)

(58) Field of Classification Search
  CPC .................... B60R 2022/027; B60R 2022/29; B60R 22/10; B60R 22/105; B60N 2/2803; B60N 2/2812; B60N 2002/2815; B60N 2002/2818
  USPC ........................... 297/468, 474, 481, 483, 484
  See application file for complete search history.

(56) References Cited

U.S. PATENT DOCUMENTS

| | | | | |
|---|---|---|---|---|
| 4,223,917 | A * | 9/1980 | Mori et al. | 280/806 |
| 4,323,278 | A * | 4/1982 | Sukopp et al. | 297/481 |
| 4,880,277 | A * | 11/1989 | Takahashi et al. | 297/467 |
| 6,371,563 | B1 | 4/2002 | Washizuka | |
| 6,666,519 | B2 * | 12/2003 | Palliser et al. | 297/483 |
| 7,188,897 | B2 * | 3/2007 | Patrizi et al. | 297/250.1 |
| 7,445,293 | B2 * | 11/2008 | Smith et al. | 297/484 |
| 2003/0071511 | A1 | 4/2003 | Stafford et al. | |

FOREIGN PATENT DOCUMENTS

| | | |
|---|---|---|
| DE | 26 54 761 A1 | 6/1978 |
| DE | 103 37 018 A1 | 3/2005 |
| EP | 1 884 419 A1 | 2/2008 |
| JP | 2004-136768 A | 5/2004 |
| WO | WO 2007/136072 A1 | 11/2007 |

OTHER PUBLICATIONS

European Search Report for Application No. EP 12 00 1387 dated Aug. 14, 2012.

* cited by examiner

*Primary Examiner* — Philip Gabler
(74) *Attorney, Agent, or Firm* — Nelson Mullins Riley & Scarborough LLP

(57) ABSTRACT

The object to provide a child safety seat with which the user is able to restrain and fasten a child in a child safety seat in a optimal way is solved by the child safety seat with the five point harness according to the invention comprises a two tongue buckle, whereby the two tongue buckle comprises guiding means through which webbing is guided and the webbing comprises stopping means to allow a predetermined length of webbing to run through the guiding means and retracting means operatively connected to at least one part of the webbing.

13 Claims, 3 Drawing Sheets

ADJUSTABLE LAP STRAP SYSTEM

CROSS-REFERENCE

This application claims priority to and the benefit of European Patent Application No. 12001387.5-2424, filed Mar. 1, 2012, the contents of which are incorporated herein by reference in entirety.

FIELD OF THE INVENTION

The invention is directed to a child safety seat with a five point harness comprising two tongue buckles.

BACKGROUND

It's known from the art that child safety seat with a five point harness and two tongue buckle will be fixed to the base or the frame structure of the car seat by bringing the two tongue buckle in alignment and engaging the tongues with the corresponding mother piece of the buckle to lock the buckle.

It is the purpose of the two tongue buckle as known in the art for several years to avoid misuse by accidently pressing the release button of the buckle. To ensure that only older children are able to open and release the buckle, at certain minimum amount of manual force needs to be applied to the opening button to press the button in a certain direction in order to release the two tongue buckle.

It is also a known problem in the art to fasten a child in a child safety seat with a predetermined force in order to ensure optimal restrained conditions in a child safety seat. A known solution to this problem is to have an adjuster strap situated underneath the two tongue buckle whereby the adjuster strap is connected to the harness in order to tighten the harness once the child is positioned properly in the child safety seat. In many known child safety seats the webbing runs through several openings and is guided through pulleys and reverse rollers to guarantee that the entire webbing of the five point harness can be tightened by a single adjuster strap.

One disadvantage of having the webbing run through various reverse rollers and pulleys is that the friction between the webbing and the individual guiding means causes the user to apply a very high manual force to tighten the webbing. It is not unusual that the user applies a substantial amount of physical force to tighten the webbing and is also successful in pulling the adjuster strap tightly but still experiences loose parts of the webbing, especially above the shoulder where the shoulder pads are situated.

Since a substantial feature of the child safety seat is to ensure that a child is restrained in an accident by means of the shoulder harness it is a significant disadvantage to have additional slack in the lap belt which can feed through to the shoulder belt in the event of either an accident or child movement which again may lead to slack in the harness

SUMMARY

While it is not possible to eliminate reverse rollers and pulleys it is an object of the present invention to provide a child safety seat with which the user is able to restrain and fasten a child in a child safety seat in an optimal way.

This technical object may be solved by the invention according to embodiments described herein and in the claims. Additional advantageous embodiments are characterized in the claims.

A child safety seat with the five point harness according to the invention comprises a two tongue buckle, characterized in that the two tongue buckle comprises guiding means through which webbing is guided and the webbing comprises stopping means to allow a predetermined length of webbing to run through the guiding means, and retracting means operatively connected to at least one part of the webbing.

Advantageously, the guiding means of each tongue buckle may be at an angle of 40° to 60° to the tongue.

Advantageously, stopping means may connect each strap of the webbing to each other after running through the guiding means of the two tongue buckle.

Preferably, the stopping means may be a single button.

According to another aspect of the present invention, the stopping means may be provided at least on one strap of the webbing and consist of a stopping area that is dimensioned so that a passage of the stopping area through the guiding means is prohibited, whereby the stopping area consists of at least one button located on the webbing, or the stopping area consists of at least one overlapping part, or the stopping area consists of at least one extra layer of webbing.

Preferably, the connection of the straps may be made in a fashion to allow each strap to tilt or move sideways.

BRIEF DESCRIPTION OF THE SEVERAL VIEWS OF THE DRAWINGS

The foregoing summary, as well as the following detailed description of the invention, may be more fully understood when read in conjunction with the appended drawings. For the purpose of illustrating the invention, examples are shown in the drawings. It should be under-stood, however, that the invention is not limited to the embodiments shown in the examples of the drawings, which are not necessarily drawn to scale, and wherein.

DETAILED DESCRIPTION

A car safety seat using the present invention will have the significant advantage that the adjuster strap 20 will only be connected to the upper part of the webbing which will be fixed or connected through the stopping means to the guiding means. The inventive stopping means allows the user to pull the adjuster strap 20 which is directly connected to the upper part of the webbing, i.e. shoulder strap to tighten the shoulder strap which is for the restraining function of the child safety seat of paramount importance. The lower part of the webbing, i.e. lap strap is operatively connected to a retracting means to maintain a predetermined tension on the lap strap.

Whether the lap strap is as tightly fastened as the shoulder strap is not decisive for the restrain function of the five point harness so that it is a priority to tight the shoulder strap.

The inventive concept allows tightening the shoulder strap without necessarily pulling the lap strap which would increase the friction in the guiding means and would be disadvantages to the user.

The stopping means according to the invention guarantees that the lap strap is only able to run a predetermined length through the guiding means until the stopping means will reach the guiding means and stop a farther running through of the shoulder strap. The lap strap will be tightened through retracting means which maybe located under the seating area or in the arm rests.

Figure 1:
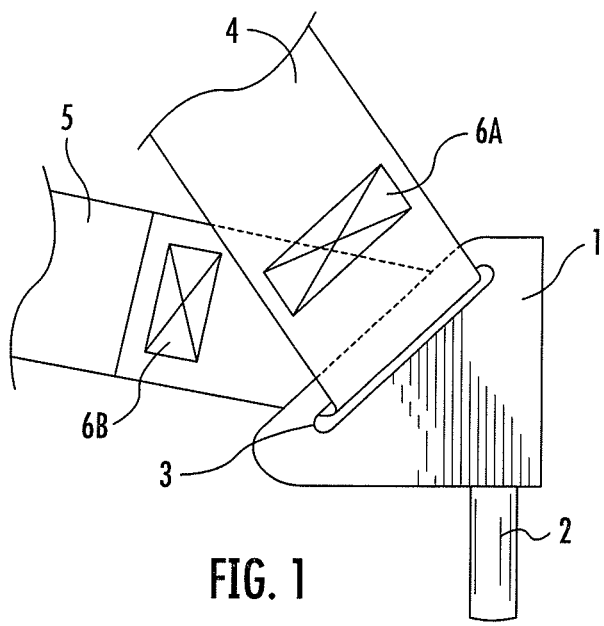
FIG. 1 shows one part of a two tongue buckle with a webbing loop that is fixed at the guiding means.

FIG. 1 shows one part of a two tongue buckle 1 with one tongue 2 and a guiding means 3 in form of an opening through which the webbing 4, 5 is routed. The guiding means 3 in all embodiments shown is identical, however, the shape and dimensions can vary. The guiding means 3 may have round corners to avoid catching the webbing 4, 5.

The stopping means 6A, 6B are made of two separate loops of the upper webbing 4 and lower webbing 5. Preferably, the loop would be created by folding the end of the webbing belt and fixing the ends to each other. The fixing can be done by rivets, thread, clamps or other mechanical means. Welding the webbing is also possible.

Figure 2:
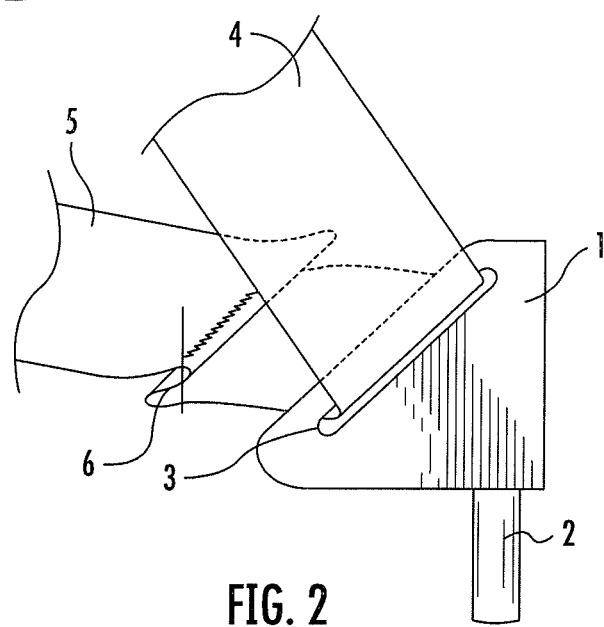
FIG. 2 shows a part of the two tongue buckle with an overlapping area as stopping means.

FIG. 2 shows one part of a two tongue buckle 1 with one tongue 2 and a guiding means 3 in form of an opening through which the webbing 4, 5 is routed. The upper webbing 4 and the lower webbing 5 are made of one piece that runs through the guiding means 3. The stopping means 6 is made of a sewn loop in the lower webbing 5.

Figure 3:
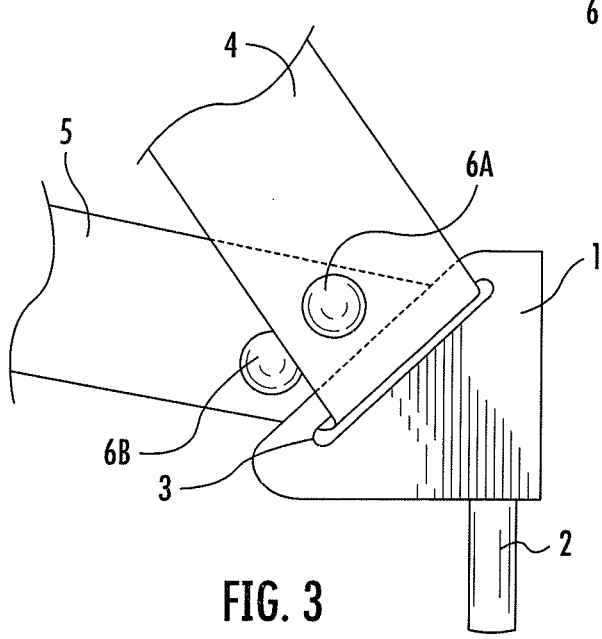
FIG. 3 shows as stopping means two buttons.

FIG. 3 shows one part of a two tongue buckle 1 with one tongue 2 and a guiding means 3 in form of an opening through which the webbing 4, 5 is routed. The upper webbing 4 and the lower webbing 5 are made of one piece that runs through the guiding means 3. The stopping means 6A and 6B is made of buttons that are inserted in the lower webbing 5 and upper webbing 4.

Figure 4:
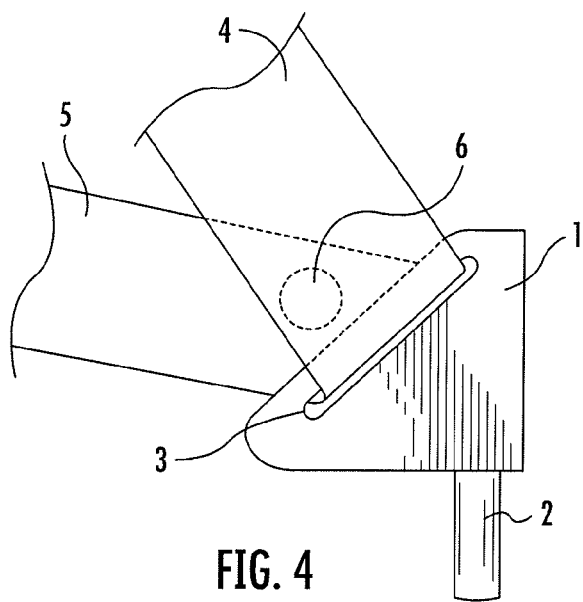
FIG. 4 shows as stopping means one button.

FIG. 4 shows one part of a two tongue buckle 1 with one tongue 2 and a guiding means 3 in form of an opening through which the webbing 4, 5 is routed. The upper webbing 4 and the lower webbing 5 are made of one piece that runs through the guiding means 3. The stopping means 6 is made of a single button that is inserted in the lower webbing 5.

Figure 5:
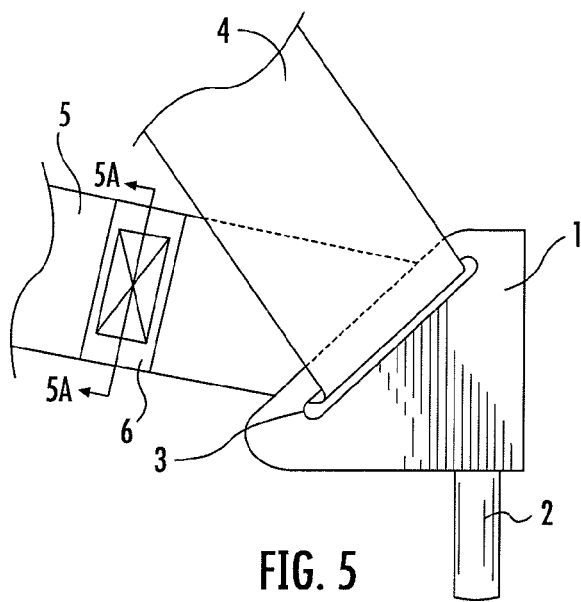
FIG. 5 shows as stopping means an additional layer of webbing.
Figure 5A:
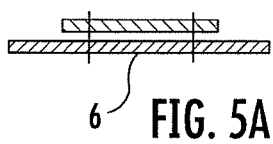
FIG. 5a a cross section of FIG. 5.

FIG. 5 shows one part of a two tongue buckle 1 with one tongue 2 and a guiding means 3 in form of an opening through which the webbing 4, 5 is routed. The upper webbing 4 and the lower webbing 5 are made of one piece that runs through the guiding means 3. The stopping means 6 is made of an extra webbing 6 to increase the height of the webbing. FIG. 5A shows a cross-section of the extra webbing.

Figure 6:
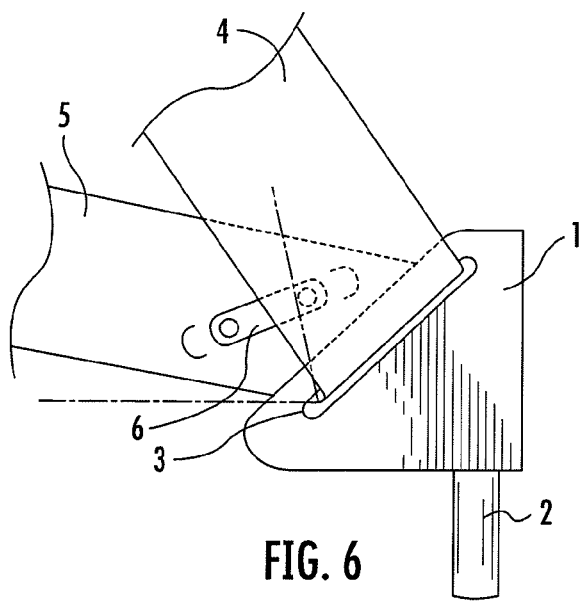
FIG. 6 a flexible connection of the webbing.

FIG. 6 shows one part of a two tongue buckle 1 with one tongue 2 and a guiding means 3 in form of an opening through which the webbing 4, 5 is routed. The upper webbing 4 and the lower webbing 5 are made of one piece that runs through the guiding means 3. The stopping means 6 is made of a flexible connection that allows the webbing 4, 5 to tilt and move sideways for better adjustment of the webbing.

Figure 7:
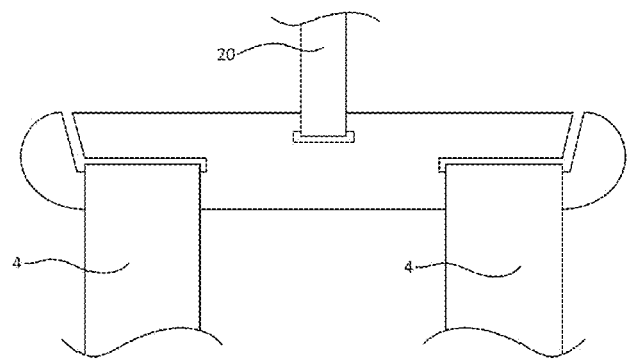
FIG. 7 a schematical view of the invention and the complete buckle.
Figure 7:
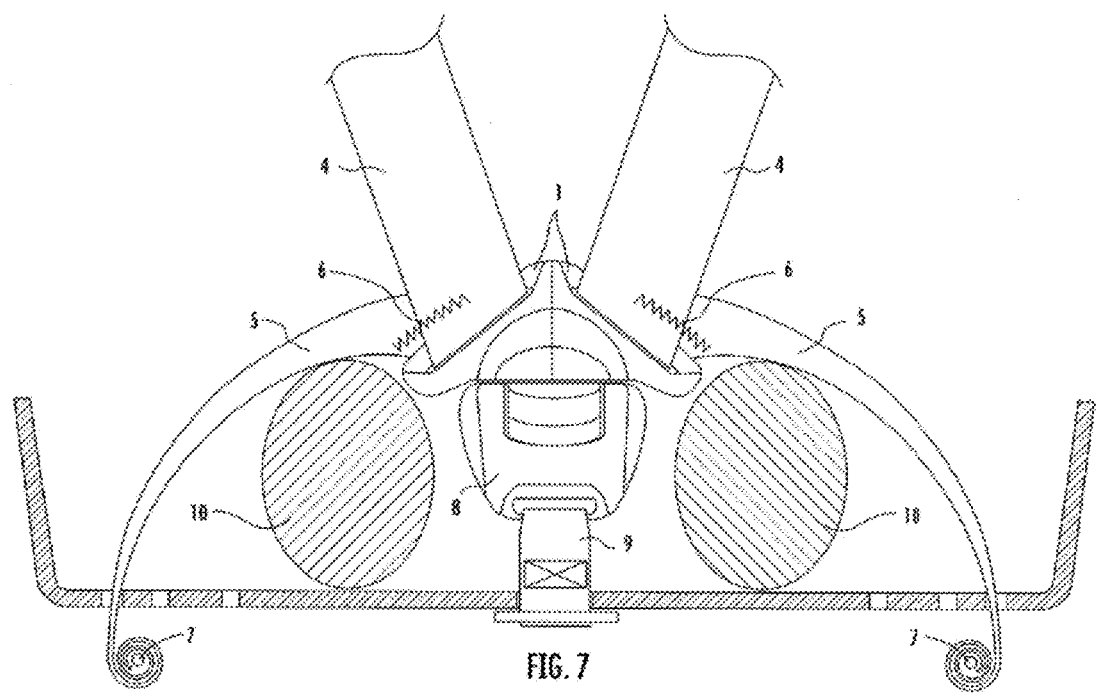

FIG. 7 shows a schematic view of the invention with the lower webbing 5 running into retracting means 7 over the legs 10 of the child. The buckle 1 is locked in the mother piece 8 which is attached by means of a short strap 9 to the seat. The retracting means 7 are able to hold the tension on the lower webbing 7 in a fashion known from seat belts. The functionality of a known seat belt retractor can be applied.

The invention claimed is:

1. A child safety seat with a five point harness comprising a webbing and a two tongue buckle, wherein the two tongue buckle comprises guiding means through which the webbing is guided, whereby the webbing is divided into an upper part and into a lower part, and wherein the webbing comprises a stopping means proximate to the two tongue buckle which is configured to allow a predetermined length of the webbing to run through the guiding means, and a retracting means operatively connected to the lower part of the webbing, and an adjuster strap connected to the upper part of the webbing, wherein the stopping means divides the upper part from the lower part, such that the adjuster strap is configured to adjust the upper part and the retracting means is configured to adjust the lower part, wherein the retracting means comprises a first retracting means for adjusting the lower part of the webbing of a first strap and a second retracting means for adjusting the lower part of the webbing of a second strap, and wherein the retracting means automatically wind to maintain predetermined tension on the lower part of the webbing.

2. The child safety seat according to claim 1, wherein the guiding means is at an angle of 40° to 60° to the tongues.

3. The child safety seat according to claim 2, wherein the stopping means is provided at least on one of the upper and lower parts of the webbing and consists of a stopping area that is dimensioned so that a passage of the stopping area through the guiding means is prohibited.

4. The child safety seat according to claim 2, wherein the stopping means configured to connect the upper part of the webbing to the lower part of the webbing.

5. The child safety seat according to claim 4, wherein the stopping means is a single button.

6. The child safety seat according to claim 1, wherein the stopping means is configured to connect the upper part of the webbing to the lower part of the webbing.

7. The child safety seat according to claim 6, wherein the stopping means is a single button.

8. The child safety seat according to claim 1, wherein the stopping means is provided at least on one of the upper and lower parts of the webbing and consists of a stopping area that is dimensioned so that a passage of the stopping area through the guiding means is prohibited.

9. The child safety seat according to claim 8, wherein the stopping area consists of at least one button located on the webbing.

10. The child safety seat according to claim 8, wherein the stopping area consists of at least one overlapping webbing part.

11. The child safety seat according to claim 8, wherein the stopping area consists of at least one extra layer of webbing.

12. The child safety seat according to claim 1, wherein the upper part of the webbing is connected to the lower part of the webbing in a fashion to allow each part of the webbing to tilt or move sideways.

13. The child safety seat according to claim 1, wherein the retracting means are directly connected to the lower part of the webbing.

\* \* \* \* \*